United States Patent
Chattopadhyay (10) Patent No.: US 9,767,671 B2
(45) Date of Patent: Sep. 19, 2017

(54) SYSTEM FOR DETERMINING SENSOR CONDITION

(71) Applicant: Intel Corporation, Santa Clara, CA (US)

(72) Inventor: Rita Chattopadhyay, Chandler, AZ (US)

(73) Assignee: INTEL CORPORATION, Santa Clara, CA (US)

( * ) Notice: Subject to any disclaimer, the term of this patent is extended or adjusted under 35 U.S.C. 154(b) by 107 days.

(21) Appl. No.: 14/533,434

(22) Filed: Nov. 5, 2014

(65) Prior Publication Data

US 2016/0125720 A1    May 5, 2016

(51) Int. Cl.
| | | |
|---|---|---|
| *G08B 23/00* | (2006.01) | |
| *G08B 21/18* | (2006.01) | |
| *G08B 25/08* | (2006.01) | |
| *G08B 13/14* | (2006.01) | |
| *H04Q 5/22* | (2006.01) | |
| *G01C 25/00* | (2006.01) | |

(52) U.S. Cl.
CPC ........... *G08B 21/187* (2013.01); *G08B 25/08* (2013.01)

(58) Field of Classification Search
CPC .................................................... G08B 21/187
USPC ........................................................ 340/514
See application file for complete search history.

(56) References Cited

U.S. PATENT DOCUMENTS

| | | |
|---|---|---|
| 6,016,465 A | 1/2000 | Kelly |
| 6,904,783 B2 | 6/2005 | Elenich et al. |
| 2002/0152056 A1 | 10/2002 | Herzog et al. |
| 2008/0177513 A1* | 7/2008 | Miller ................ G05B 17/02 703/2 |
| 2011/0265768 A1* | 11/2011 | Kerns ................ F02M 25/089 123/521 |
| 2012/0265486 A1* | 10/2012 | Klofer ................ G01F 23/0061 702/166 |
| 2013/0191681 A1 | 7/2013 | Moiseev et al. |
| 2013/0304385 A1* | 11/2013 | Gillette, II ......... G01N 33/0009 702/6 |

(Continued)

OTHER PUBLICATIONS

International Search Report and Written Opinion from related application PCT/US2015/054617 mailed Jan. 21, 2016

(Continued)

*Primary Examiner* — Jack K Wang
(74) *Attorney, Agent, or Firm* — Grossman, Tucker, Perreault & Pfleger, PLLC.

(57) ABSTRACT

The present disclosure is directed to a system for determining sensor condition. A sensor signal generated by a sensor to communicate the current condition of an aspect being monitored by the sensor may also be employed to determine the condition of the sensor itself. For example, a device capable of determining if the sensor condition is normal or malfunctioning (e.g., erratic, stuck, etc.) may comprise a monitoring module (MM) to receive the sensor signal. The MM may comprise a sensor condition determination module (SCDM) to determine sensor condition. The SCDM may include a feature extraction engine to determine various characteristics of (e.g., to "extract features" from) the sensor signal and a model to determine sensor condition based on the extracted features. The model may include a support vector machine (SVM) taught to determine sensor condition utilizing sampled sensor signals correlated with annotations of sensor condition.

16 Claims, 9 Drawing Sheets

(56) References Cited

U.S. PATENT DOCUMENTS

| | | | |
|---|---|---|---|
| 2014/0039834 A1 | 2/2014 | Shibuya et al. | |
| 2016/0069771 A1* | 3/2016 | Makki | F02M 25/0809 |
| | | | 73/40.5 R |
| 2016/0082832 A1* | 3/2016 | Dudar | B60K 15/077 |
| | | | 206/459.1 |
| 2016/0097671 A1* | 4/2016 | Faber | G01F 23/0069 |
| | | | 342/124 |

OTHER PUBLICATIONS

International Preliminary Report on Patentability and Written Opinion issued in PCT Application No. PCT/US2015/054617, dated May 18, 2017, 11 pages.

* cited by examiner

SYSTEM FOR DETERMINING SENSOR CONDITION

TECHNICAL FIELD

The present disclosure relates to monitoring systems, and more particularly, to a system for determining if a sensor is operating normally based only on a signal generated by the sensor.

BACKGROUND

Sensors may be employed in a variety of applications to provide feedback for controlling a process. For example, volume monitoring may be utilized to determine a volume of material in a vessel for emptying the vessel when filled, filling the vessel when empty, detecting leaks in the vessel, etc. Traditionally, when a vessel (e.g., a tank) required service (e.g., emptying or filling) a customer would request the required service from a service provider. The service provider may then schedule the required service based on workforce availability, material availability, routing efficiency, etc. The problem with this business model is that the customer is forced to wait for the required service, which may impact their productivity, profitability, and satisfaction with the service provider. To better serve their customer, just-in-time delivery models were developed to deliver services to customers exactly when needed, which allowed the customers to concentrate on their business without concern over raw materials. In a just-in-time model, success for both the service provider and customer may depend on the accuracy and freshness of inventory data. For example, an oil company may track levels in customer oil supply tanks to determine when a truck needs to be dispatched to refill the tanks, may track the level of oil in a customer waste oil tanks to determine how long until the tanks must be emptied, may monitor for leaking tanks, etc.

In modern installations, telemetry data may be provided by volume sensors on each tank that automatically report fill levels on a real-time basis. When functioning correctly, the volume sensors provide data required by the service provider to meet customer needs while allowing the service provider to maximize their profits through material and schedule optimization. However, when malfunctioning, volume sensors may cause issues for both customer and service provider. Volume sensors that errantly report full or empty tank conditions may cause material shortage or waste overflow conditions at a customer, which may negatively impact productivity, profitability and customer satisfaction. Moreover, without accurate volume level data the service provider is forced into a mode of operation where resources may be expended needlessly (e.g., trucks may be sent out when unneeded) or haphazardly (e.g., to service emergency customer requirements) that may impact the service provider's ability to service their customers reliably, profitability, etc.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Although the following Detailed Description will proceed with reference being made to illustrative embodiments, many alternatives, modifications and variations thereof will be apparent to those skilled in the art.

DETAILED DESCRIPTION

The present disclosure is directed to a system for determining sensor condition. A sensor signal generated by a sensor to communicate the current condition of an aspect being monitored by the sensor may also be employed to determine the condition of the sensor itself. For example, a device capable of determining if the sensor condition is normal or malfunctioning (e.g., erratic, stuck, etc.) may comprise a monitoring module (MM) to receive the sensor signal. The MM may comprise a sensor condition determination module (SCDM) to determine sensor condition. The SCDM may include a feature extraction engine to determine various characteristics of (e.g., to "extract features" from) the sensor signal and a model to determine sensor condition based on the extracted features. The model may include a support vector machine (SVM) taught to determine sensor condition utilizing sampled sensor signals correlated with annotations of sensor condition. In at least one embodiment, the sensor may be a volume sensor generating a volume level signal. In the same or another embodiment, the MM may also generate a sensor condition notification.

In at least one embodiment, a device to determine sensor condition may comprise at least a communication module and a MM. The communication module may be to interact with at least a sensor. The MM may be to receive a sensor signal from the sensor via the communication module. The MM may include at least a SCDM to determine a condition for the sensor based on the sensor signal.

In at least one example implementation, the sensor may be a volume sensor (e.g., a tank level sensor) and the sensor signal may be a volume level signal (e.g., a tank level signal). The MM may further be to generate a sensor condition notification based on the condition. The SCDM may be to determine that the sensor is in a normal condition, an erratic condition or a stuck condition based only on the sensor signal. An example SCDM may comprise at least a feature extraction engine to extract features from the sensor signal and a sensor condition model to determine the condition based at least on the extracted features. The feature extraction engine may be to, for example, extract at least time domain features and frequency domain features from the sensor signal. The sensor condition model may comprise, for example, an SVM taught to determine the condition based on a sampling of sensor signals and corresponding annotations of sensor condition for each of the sampled sensor signals.

Consistent with the present disclosure, an example method for teaching a model to determine sensor condition may comprise receiving at least one sensor signal and a corresponding annotation of sensor condition including one of a normal condition, erratic condition or stuck condition, processing the at least one sensor signal, extracting features from the at least one sensor signal, selecting features from the extracted features and developing a model for determining sensor condition based at least on the selected features and the corresponding annotation. An example method for determining sensor condition may comprise receiving a sensor signal from a sensor, extracting features from the sensor signal, inputting the extracted features into a model for determining sensor condition and determining sensor condition based on the model.

Figure 1A:
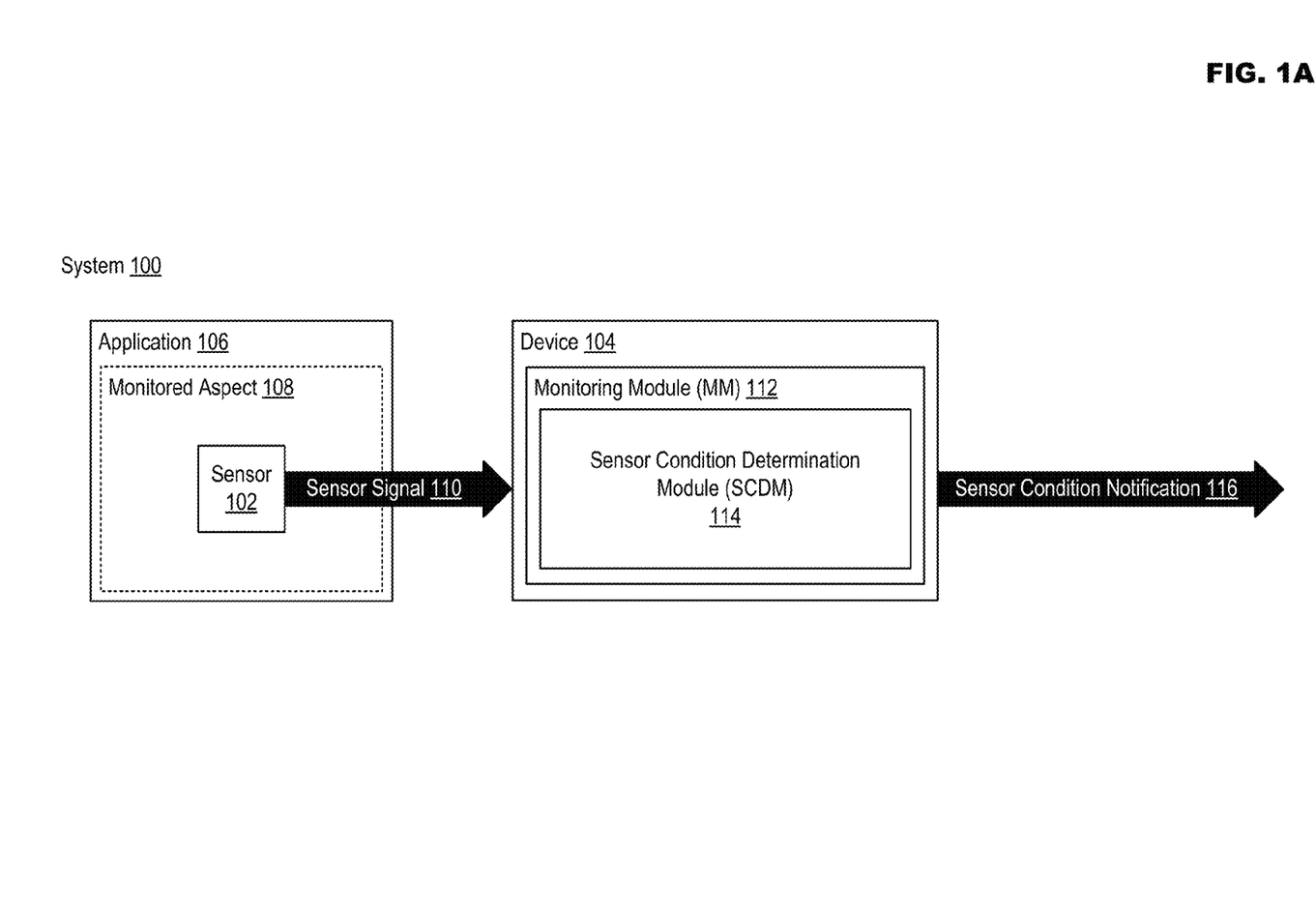
FIG. 1A illustrates an example system for determining sensor condition in accordance with at least one embodiment of the present disclosure.

FIG. 1A illustrates an example system for determining sensor condition in accordance with at least one embodiment of the present disclosure. System 100 may comprise sensor 102 in application 108 monitoring aspect 108. Sensor 102 may generate sensor signal 110 in regard to monitored aspect 108, and may then transmit sensor signal 110 to at least device 104 (e.g., via wired and/or wireless communication). Device 104 may comprise at least MM 112, which may include SCDM 114. In at least one embodiment, SCDM 114 may receive sensor signal 110 from MM 112, and may determine a condition for sensor 102 based on sensor signal 110. Consistent with the present disclosure, MM 112 may further generate sensor condition notification 116 to communicate the condition of sensor 102 determined by SCDM 114 based on sensor signal 110.

Sensor 102 may correspond to almost any sensor 102 configured to monitor any aspect 108 in application 106. For example, sensor 102 may be based on electronic, electromechanical, electromagnetic or electrochemical technology and may be utilized to determine any aspect 108 of application 106 such as, but not limited to, temperature, volume, chemical composition, flow rate, viscosity, light emission, contact, presence, proximity, acceleration, location, distance, item count, etc. The monitoring of aspect 108 may result in sensor 102 generating sensor signal 110, which may correspond to the detection, quantity, intensity, etc. of the monitored aspect 108. In general, the systems, teachings and methodologies disclosed herein may be applicable to any sensor 102 capable of generating an electronic signal corresponding to monitored aspect 108.

Sensor 102 may transmit sensor signal 110 on a periodic basis (e.g., per second, minute, hour, daily, etc.), in response to a request from device 104 (e.g., to conserve power in battery-powered sensors 102), etc. Sensor signal 110 may be transmitted via a wired and/or wireless communication medium. Both wired and wireless communication may be utilized in certain implementations. For example, worksite comprises a plurality of sensors 102 that wirelessly transmit sensor signals 110 to a worksite accumulator (e.g., a local data server operating on both wired and wireless networks). The worksite accumulator may then transmit the accumulated sensor signals 110 via wired communication to a remote location (e.g., a service provider).

Device 104 may be any device comprising processing resources capable of carrying out activities such as will be described below in regard to the various embodiments disclosed herein. While particular abilities and features will be disclosed in FIG. 2, various examples of device 104 may comprise, but are not limited to, a mobile communication device such as a cellular handset, a smart phone, etc. based on the Android® operating system (OS) from the Google Corporation, iOS® from the Apple Corporation, Windows® OS from the Microsoft Corporation, Mac OS from the Apple Corporation, Tizen™ OS from the Linux Foundation, Firefox® OS from the Mozilla Project, Blackberry® OS from the Blackberry Corporation, Palm® OS from the Hewlett-Packard Corporation, Symbian® OS from the Symbian Foundation, etc., a mobile computing device such as a tablet computer like an iPad® from the Apple Corporation, a Surface® from the Microsoft Corporation, Galaxy Tab® from the Samsung Corporation, a Kindle Fire® from the Amazon Corporation, etc., an Ultrabook® including a low-power chipset manufactured by Intel Corporation, netbooks, a notebook, a laptop, a palmtop, etc., a wearable devices such as wristwatch form factor computing devices like the Galaxy Gear® from Samsung, eyewear form factor interfaces like Google Glass® from the Google Corporation, etc., a typically stationary computing device such as a desktop computer, a server, a smart television, a small form factor computing solution (e.g., for space-limited computing applications, TV set-top boxes, etc.) like the Next Unit of Computing (NUC) platform from the Intel Corporation, etc. Consistent with the examples presented above, device 104 may be situated proximate to sensor 102 (e.g., within the same device, on the same worksite, etc.) or remotely from sensor 102 (e.g., at a service provider). In at least one example implementation, device 104 may be a computing device accessible to sensor 102 via a local-area network (LAN), a wide-area network (WAN) like the Internet, a global-area network (GAN), etc. An example of such an implementation may include at least one data server configured to operate as part of a cloud-computing architecture. In an example cloud computing architecture, sensor 102 may provide sensor signal 110 to the cloud server (e.g., directly, via a worksite accumulator, etc.), and a service provider may then access the cloud server to obtain sensor signals 110, an indication as to the condition of sensor 102, or may simply receive sensor condition notification 116. In this instance, it may be possible for a third party (e.g., a data service provider) to provide cloud-based data handling services for both the customer (e.g., an oil consumer) and service provider (e.g., an oil company).

Device 104 may comprise, for example, at least monitoring module (MM) 112. MM 112 may comprise equipment and/or software configured to at least receive sensor signal 110 from sensor 102, and to generate sensor condition notification 116. Sensor condition notification 116 may include data generated on a periodic basis (e.g., such as a status report), data generated on an as-needed basis (e.g., an alert message or report), etc. MM 112 may also be configured to monitor the aspect 108 reported by sensor signal 110, and thus, to issue messages, alerts, etc. in regard to providing services in regard to aspect 108 (e.g., alerts dues to aspect 108 being too low or high, etc.). MM 112 may comprise SCDM 114 to determine the condition of sensor 102. Consistent with the present disclosure, sensor 102 may output sensor signal 110 corresponding to a non-negative number ranging between 0-100 (e.g., representing the current status of aspect 108). Occasionally sensor 102 may start to malfunction and generate "erratic" signals due to conditions such as, for example, the volume-sensing portion of sensor 102 becoming dislodged, an unstable voltage regulator, a poorly assembled coaxial cable assembly, electronic component drift caused by very cold temperatures, etc. Sensor 102 may also get "stuck" generating the same sensor signal 110 due to, for example, a sensing mechanism in sensor 102 being damaged (e.g., a foreign object falling on a probe wire), locking-up due to lack of use, etc. Sensor 102 operating in an erratic condition may cause sensor signal 110 to vary very rapidly, producing significantly high frequency components, while sensor signal 110 from a stuck sensor 102 may remain constant for a long period of time. The amplitude of data from a stuck sensor 102 may be significantly lower than in an erratic or normal sensor 102. SCDM 114 may leverage this behavior in sensor signal 110 by, for example, extracting various time-domain and/or frequency-domain characteristics (e.g., features) from sensor signal 110 and then employing a model to identify the condition of sensor 102 in real time. After the condition of sensor 102 is determined in SCDM 114, MM 112 may generate sensor condition notification 116 for presentation (e.g., using audible/visible/tactile interaction), for transmission via wired and/or wireless communication, etc. For example, a service provider seeing, hearing, feeling and/or receiving sensor condition notification 116 may understand the condition of sensor 102, whether sensor 102 is reporting an accurate measurement of aspect 108, whether sensor 102 requires servicing, etc.

It is important to note that, consistent with the present disclosure, the condition of sensor 102 may be determined utilizing only sensor signal 110. Existing monitoring solutions may employ redundant sensing such as, for example, secondary sensors using a different technology. These solutions may increase the amount of complexity, expense, etc. associated with system 100. However, in the various embodiments disclosed herein the condition of the sensor may be determined based only on sensor signal 110, which is already being provided to MM 112 in the ordinary course of operation. As a result, specialized equipment or procedures are not required to determine the condition of sensor 102, which may be desirable from an ease-of-implementation standpoint for new or existing monitoring systems.

While system 100 in FIG. 1A illustrates a generalized embodiment consistent with the present disclosure, to aid with comprehension it may be beneficial to place system 100 into a more practical context. For example, system 100' in FIG. 1B discloses an example of volume level monitoring. Sensor 102' may be, for example, a sensor coupled to tank 106 configured to determine a volume of liquid 108' inside of tank 106'. Tank 106' may be any item or structure capable of retaining liquid 108'. Sensor 102' may not be limited to determining a fill level of liquid 108 inside of tank 106', and may alternatively be tasked with determining the fill level of other fillable materials in tank 106' (e.g., sand, loose aggregates, gases, etc.). Sensors 102' may determine the fill level of liquid 108' in tank 106' employing electromechanical technology for level determination (e.g., a float sensor, load cell, etc.), electronic technology (e.g., micropower impulse radar), etc.

Figure 1B:
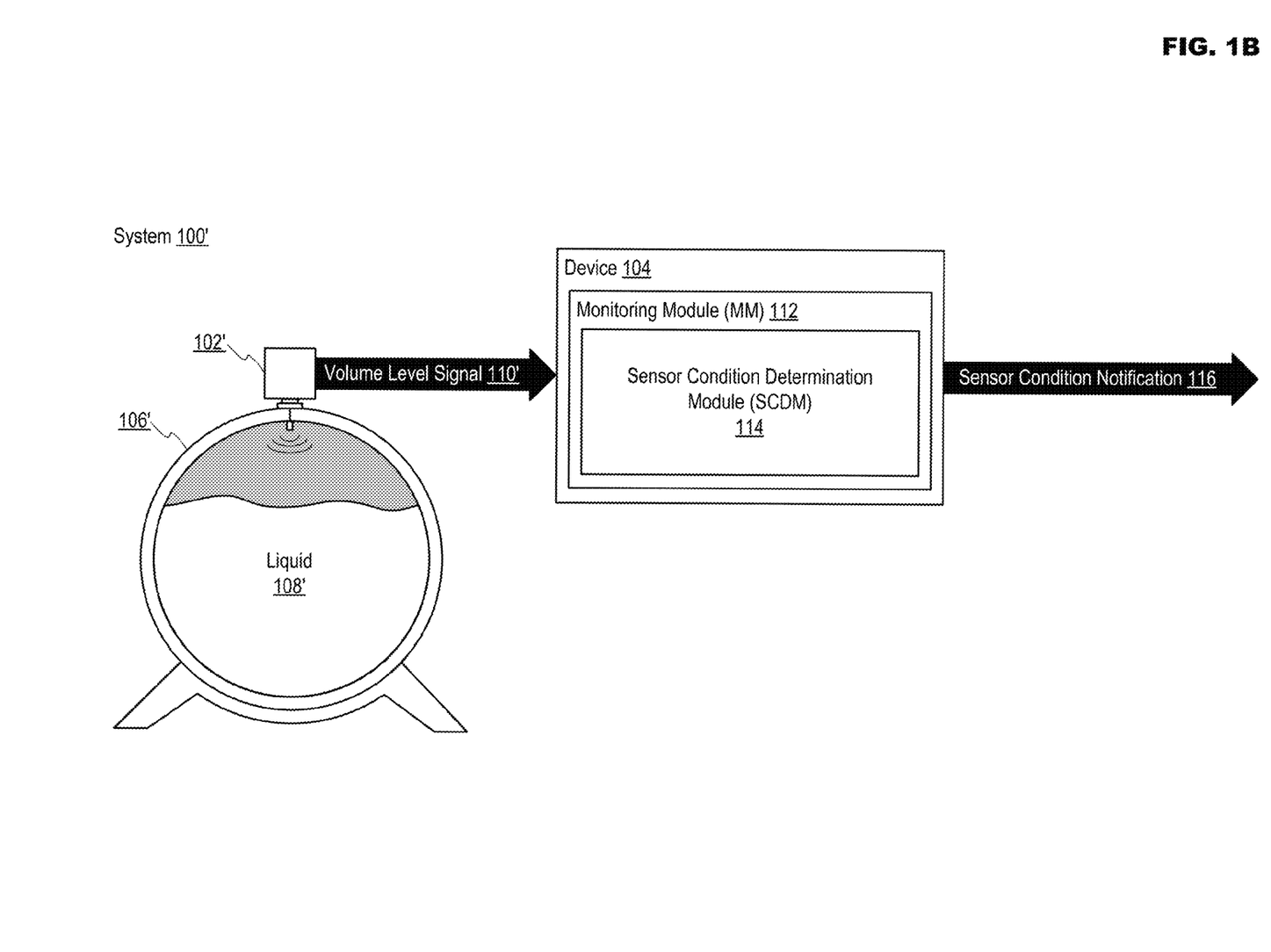
FIG. 1B illustrates the example system of FIG. 1 being utilized for a volume monitoring application in accordance with at least one embodiment of the present disclosure

In an example of operation, volume sensor 102' may sense the fill level of liquid 108 in tank 106 and may then transmit volume level signal 110' based on the sensed fill level. Similar to FIG. 1, MM 112 may receive volume level signal 110' from volume sensor 102'. In at least one embodiment, MM 112 may react to volume level signal 110' and may, for example, alert a service provider when volume level signal 110' indicates that tank 106' is empty or full (e.g., based on whether tank 106' is a supply material tank or a waste material tank). Volume level signal 110' may also be provided to SCDM 114 in MM 112. SCDM 114 may determine, based on volume level signal 110', whether volume sensor 102' is functioning normally or if volume sensor 102' is malfunctioning (e.g., is erratic, stuck, etc.). MM 112 may then generate sensor condition notification 116 based on the determination of sensor condition by SCDM 114. In at least one embodiment, sensor condition notification 116 may be generated regularly (e.g., as a report). Alternatively, sensor condition notification 116 may be generated only when volume sensor 102' is determined to be malfunctioning (e.g., as an alert to a service provider that the measurement of liquid level 108' in tank 106' is probably incorrect, that volume sensor 102' requires service, etc.).

Figure 2:
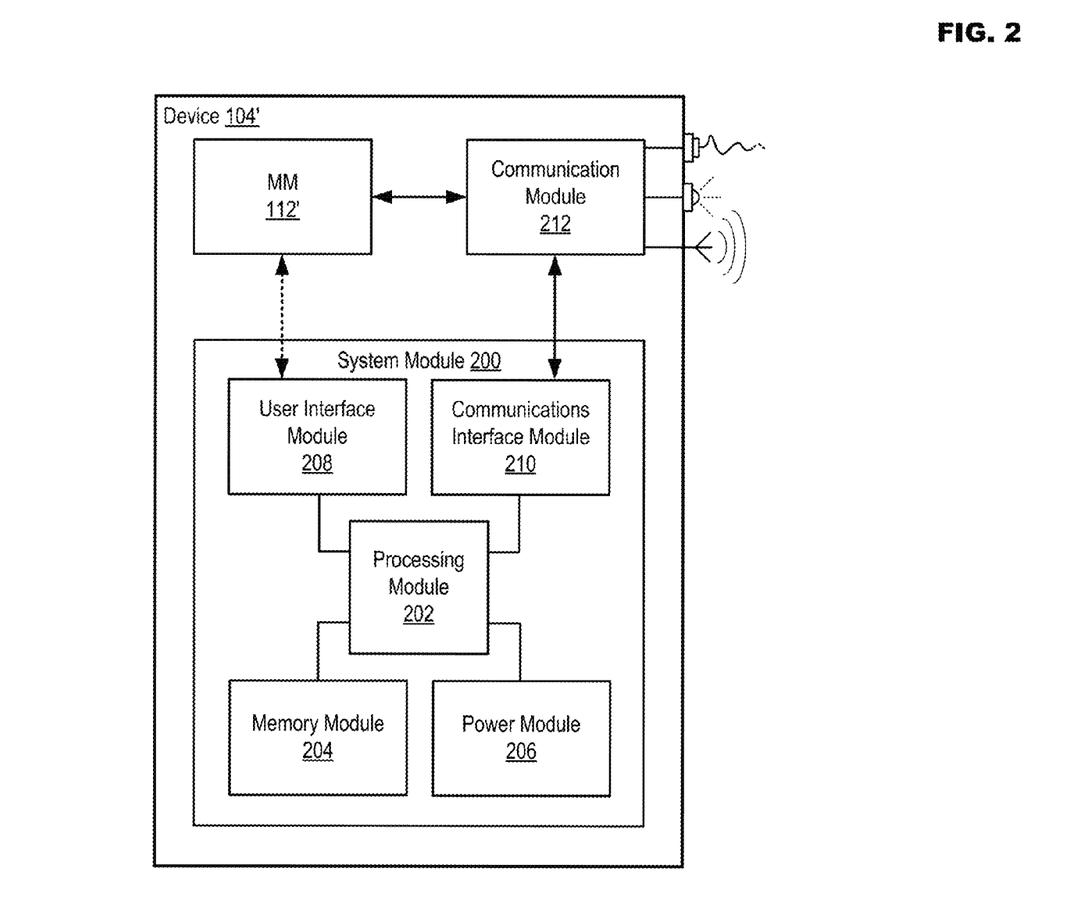
FIG. 2 illustrates an example configuration for a device usable in accordance with at least one embodiment of the present disclosure.

FIG. 2 illustrates an example configuration for a device usable in accordance with at least one embodiment of the present disclosure. In particular, example device 104' may be capable of performing any of the activities disclosed in FIG. 1. However, device 104' is meant only as an example of an apparatus usable in embodiments consistent with the present disclosure, and is not meant to limit any of these various embodiments to any particular manner of implementation.

Device 104' may comprise, for example, system module 200 configured to manage device operations. System module 200 may include, for example, processing module 202, memory module 204, power module 206, user interface module 208 and communication interface module 210. Device 104' may further include communication module 212 and MM 112'. While communication module 212 and MM 112' have been illustrated as separate from system module 200, the example implementation shown in FIG. 2 has been provided merely for the sake of explanation. Some or all of the functionality associated with communication module 210 and/or MM 112' may also be incorporated into system module 200.

In device 104', processing module 202 may comprise one or more processors situated in separate components, or alternatively, one or more processing cores embodied in a single component (e.g., in a System-on-a-Chip (SoC) configuration) and any processor-related support circuitry (e.g., bridging interfaces, etc.). Example processors may include, but are not limited to, various x86-based microprocessors available from the Intel Corporation including those in the Pentium, Xeon, Itanium, Celeron, Atom, Core i-series, Quark product families, Advanced RISC (e.g., Reduced Instruction Set Computing) Machine or "ARM" processors, etc. Examples of support circuitry may include chipsets (e.g., Northbridge, Southbridge, etc. available from the Intel Corporation) configured to provide an interface through which processing module 202 may interact with other system components that may be operating at different speeds, on different buses, etc. in device 104'. Some or all of the functionality commonly associated with the support circuitry may also be included in the same physical package as the processor (e.g., such as in the Sandy Bridge family of processors available from the Intel Corporation).

Processing module 202 may be configured to execute various instructions in device 104'. Instructions may include program code configured to cause processing module 202 to perform activities related to reading data, writing data, processing data, formulating data, converting data, transforming data, etc. Information (e.g., instructions, data, etc.) may be stored in memory module 204. Memory module 204 may comprise random access memory (RAM) and/or read-only memory (ROM) in a fixed or removable format. RAM may include volatile memory configured to hold information during the operation of device 104' such as, for example, static RAM (SRAM) or Dynamic RAM (DRAM). ROM may include non-volatile (NV) memory modules configured based on BIOS, UEFI, etc. to provide instructions when device 104' is activated, programmable memories such as electronic programmable ROMs (EPROMS), Flash, etc. Other fixed/removable memory may include, but are not limited to, magnetic memories such as, for example, floppy disks, hard drives, etc., electronic memories such as solid state flash memory (e.g., embedded multimedia card (eMMC), etc.), removable memory cards or sticks (e.g., micro storage device (uSD), USB, etc.), optical memories such as compact disc-based ROM (CD-ROM), Digital Video Disks (DVD), Blu-Ray Disks, etc.

Power module 206 may include internal power sources (e.g., a battery, fuel cell, etc.) and/or external power sources (e.g., electromechanical or solar generator, power grid, external fuel cell, etc.), and related circuitry configured to supply device 104' with the power needed to operate. User interface module 208 may include hardware and/or software to allow users to interact with device 104' such as, for example, various input mechanisms (e.g., microphones, switches, buttons, knobs, keyboards, speakers, touch-sensitive surfaces, one or more sensors configured to capture images and/or sense proximity, distance, motion, gestures, orientation, etc.) and various output mechanisms (e.g., speakers, displays, lighted/flashing indicators, electromechanical components for vibration, motion, etc.). The hardware in user interface module 208 may be incorporated within device 104' and/or may be coupled to device 104' via a wired or wireless communication medium.

Communication interface module 210 may be configured to manage packet routing and other control functions for communication module 212, which may include resources configured to support wired and/or wireless communications. In some instances, device 104' may comprise more than one communication module 212 (e.g., including separate physical interface modules for wired protocols and/or wireless radios) managed by a centralized communication interface module 210. Wired communications may include serial and parallel wired mediums such as, for example, Ethernet, USB, Firewire, Thunderbolt, Digital Video Interface (DVI), High-Definition Multimedia Interface (HDMI), etc. Wireless communications may include, for example, close-proximity wireless mediums (e.g., radio frequency (RF) such as based on the RF Identification (RFID) or Near Field Communications (NFC) standards, infrared (IR), etc.), short-range wireless mediums (e.g., Bluetooth, WLAN, Wi-Fi, etc.), long range wireless mediums (e.g., cellular wide-area radio communication technology, satellite-based communications, etc.), electronic communications via sound waves, etc. In one embodiment, communication interface module 210 may be configured to prevent wireless communications that are active in communication module 212 from interfering with each other. In performing this function, communication interface module 210 may schedule activities for communication module 212 based on, for example, the relative priority of messages awaiting transmission. While the embodiment disclosed in FIG. 2 illustrates communication interface module 210 being separate from communication module 212, it may also be possible for the functionality of communication interface module 210 and communication module 212 to be incorporated into the same module.

Consistent with the present disclosure, MM 112' may be able to interact with at least communication module 212, and optionally with user interface module 208. In an example of operation, MM 112' may receive sensor signal 110 from sensor 102 via communication module 212. Following a determination of the condition of sensor 102 by SCDM 114 based on sensor signal 110, MM 112' may then generate sensor condition notification 116. In at least one embodiment, MM 112' may cause communication module 212 to transmit sensor condition notification 116 via wired and/or wireless communication (e.g., to a service provider). Along with, or instead of, sending sensor condition notification 116 via communication module 212, MM 112' may provide sensor condition notification 116 to user interface module 208 for presentation to a user of device 104'. Presentation may include, for example, displaying a visual notification, generating an audible and/or tactile notification, etc. The presentation may indicate, for example, whether sensor 102 was determined to be in a normal condition or a malfunctioning condition (e.g., erratic, stuck, etc.).

Figure 3:
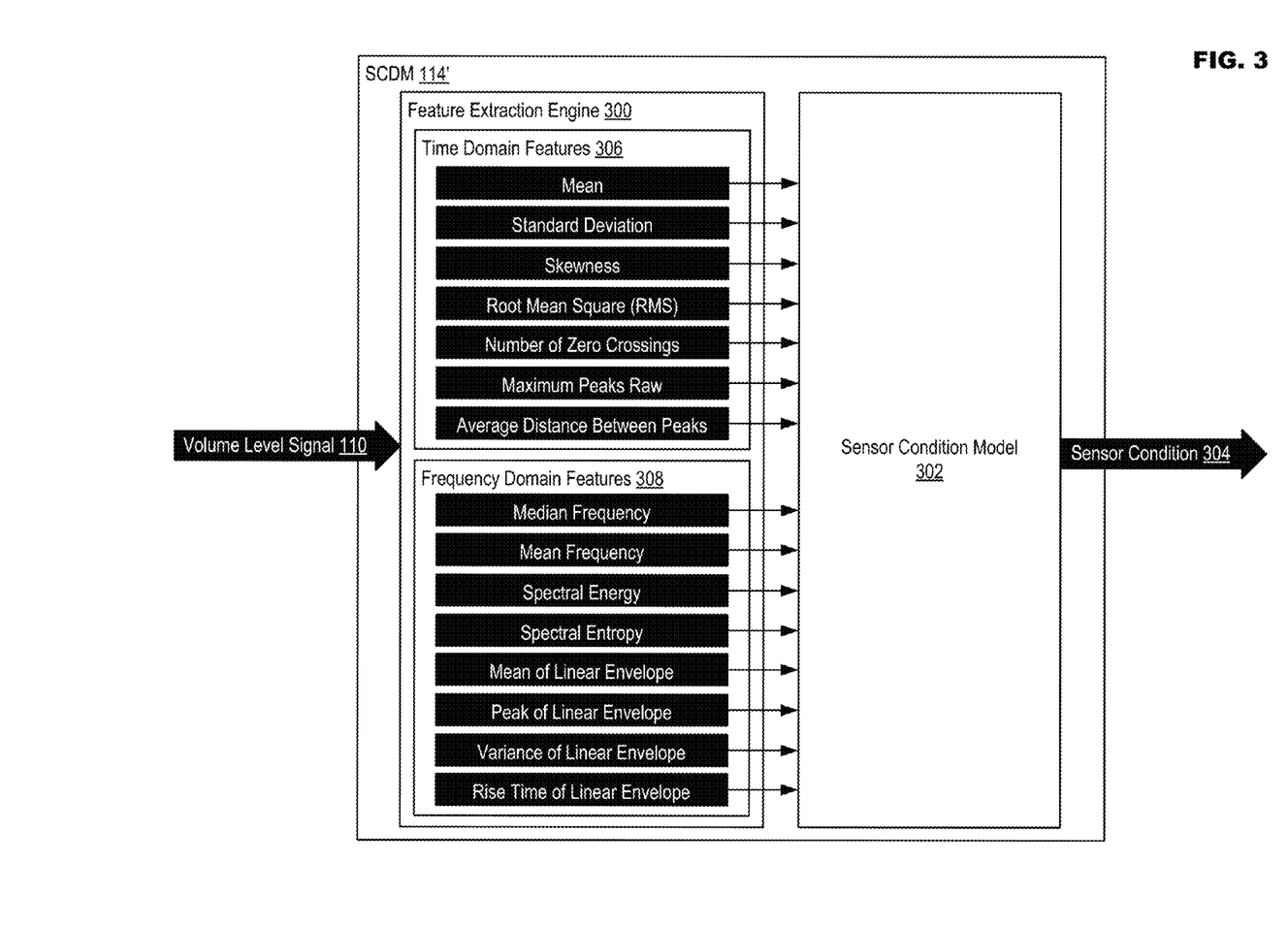
FIG. 3 illustrates an example implementation of a sensor condition determination module (SCDM) in accordance with at least one embodiment of the present disclosure.

FIG. 3 illustrates an example implementation of an SCDM in accordance with at least one embodiment of the present disclosure. SCDM 114' may comprise, for example, feature extraction engine 300 and sensor condition model 302. Feature extraction engine may extract features from (e.g., compute characteristics based on) sensor signal 110. The extracted features may be employed by sensor condition model 302 in determining sensor condition 304 (e.g., which may be utilized by MM 112 when generating sensor condition notification 116).

The features extracted by feature extraction engine 300 may comprise, for example, time domain features 306 and frequency domain feature 308. Example time domain features 306 may include, but are not limited to, mean, standard deviation, "skewness" (e.g., Kurtosis average), root mean square (RMS), number of zero crossings, raw number of maximum peaks, average distance between peaks, etc. Mean, standard deviation, skewness and RMS may be determined statistically. A number of zero crossings may be determined by counting the number of times sensor signal 110 crosses the mean value in a certain window of time. A peak value may be determined by the maximum value that sensor signal 110 obtained in every window.

Example frequency domain features 308 may include, but are not limited to, median frequency, mean frequency, spectral energy, spectral entropy, mean of linear envelope, peak of linear envelope, variance of linear envelope and rise time of linear envelope. Median frequency (mf), which is a measure of Skewness in the power spectrum, may be defined as the frequency that divides the power spectrum into two equal parts and was obtained as follows:

$$\Sigma_{i=1}^{m} I_i = \Sigma_{i=m+1}^{n} I_i \tag{1}$$

where n is the total number of frequency bins (e.g., 0.5*512=256), $I_i$ is the amplitude or intensity of spectrum at the i-th bin and median frequency (mf)=f(m), the frequency of spectrum at m-th bin. Mean frequency may be defined as the normalized, first order spectral moment. It may be calculated as the sum of the product of the spectrogram amplitude and the frequency, divided by the total sum of the spectrogram amplitude or intensity, as follows:

$$\text{Mean Frequency} = \frac{\sum_{i=1}^{n} I_i * f_i}{\sum_{i=1}^{n} I_i} \tag{2}$$

Wherein fi is the frequency of spectrum at i-th bin of n frequency bins. The spectral energy may be obtained based on the following relationship:

$$\text{Spectral energy} = \left(\frac{1}{n}\right) * \sum_{i=1}^{n} I_i^2 \quad (3)$$

The spectral entropy, which may define the entropy in the power spectrum, may be obtained based on the following relationship:

$$\text{Spectral entropy} = -\sum_{i=1}^{n} p_i * \log(p_i) \quad (4)$$

$$\text{where } p_i = \frac{I_i}{\sum_{j=1}^{n} I_j} \quad (5)$$

The remaining frequency domain features 308 may be derived utilizing a linear envelope. A linear envelope is a low frequency representation of a signal that may be extracted to study the pattern of sensor signal 110 under the three different conditions, and most applicably the erratic condition. The linear envelope of sensor signal 110 may be determined utilizing, for example, a Butterworth low pass filter of 3rd order with a cutoff frequency of 2% of the bandwidth of sensor signal 110.

Sensor condition model 302 may determine sensor condition 304 based on time domain features 306 and/or frequency domain features 308. Sensor condition model 302 may be based on a machine learning methodology such as, but not limited to support vector machine (SVM), discriminant Analysis, K-Nearest Neighbor, etc. The selection of a machine learning type may be based on testing (e.g. a particular sensor 102 in a particular application 106). For example, following test data collection (e.g., the collection of sensor signals 110 and corresponding annotations of an observed condition of sensor 102) features belonging to all of the conditions may be randomly divided into groups for testing (e.g., 65% for training and 35% for testing). Classification model fit (% Accuracy) may then be computed over the test data. Average classification model fit (e.g., over ten such rounds) may be considered for identifying the most suitable classification method.

For the sake of explanation herein, sensor condition model 302 will be discussed as an SVM. In machine learning, SVMs are supervised learning models with associated learning algorithms that may analyze data in order to generate patterns that may be utilized for classification and regression analysis. Given a set of training examples with each train example being marked as belonging to a certain category, an SVM training algorithm may build a model that assigns new examples into each category. An SVM model may be a representation of the examples as points in space, mapped so that the examples of the separate categories are divided by a clear gap. The larger the gap, the smaller is the fault detection ambiguity. New examples may then be mapped into that same space and predicted to belong to a category based on which side of the gap they fall on. In addition to performing linear classification, SVMs may efficiently perform non-linear classification using what is called "the kernel trick," implicitly mapping inputs into high-dimensional feature spaces. SVMs may be characterized by parameters such as, for example, type of kernel function, standard deviation of the kernel function (e.g., if a Gaussian function is used as the kernel function), error penalty and error tolerance. These parameters may be selected based on a trial and error method, and may each significantly impact SVM model performance. Consistent with the present disclosure, parameters that have been empirically shown to yield the best performance are 'Gaussian kernel function', 'standard deviation=0.25', 'error penalty=10' and 'error tolerance=0.00005'.

Figure 4:
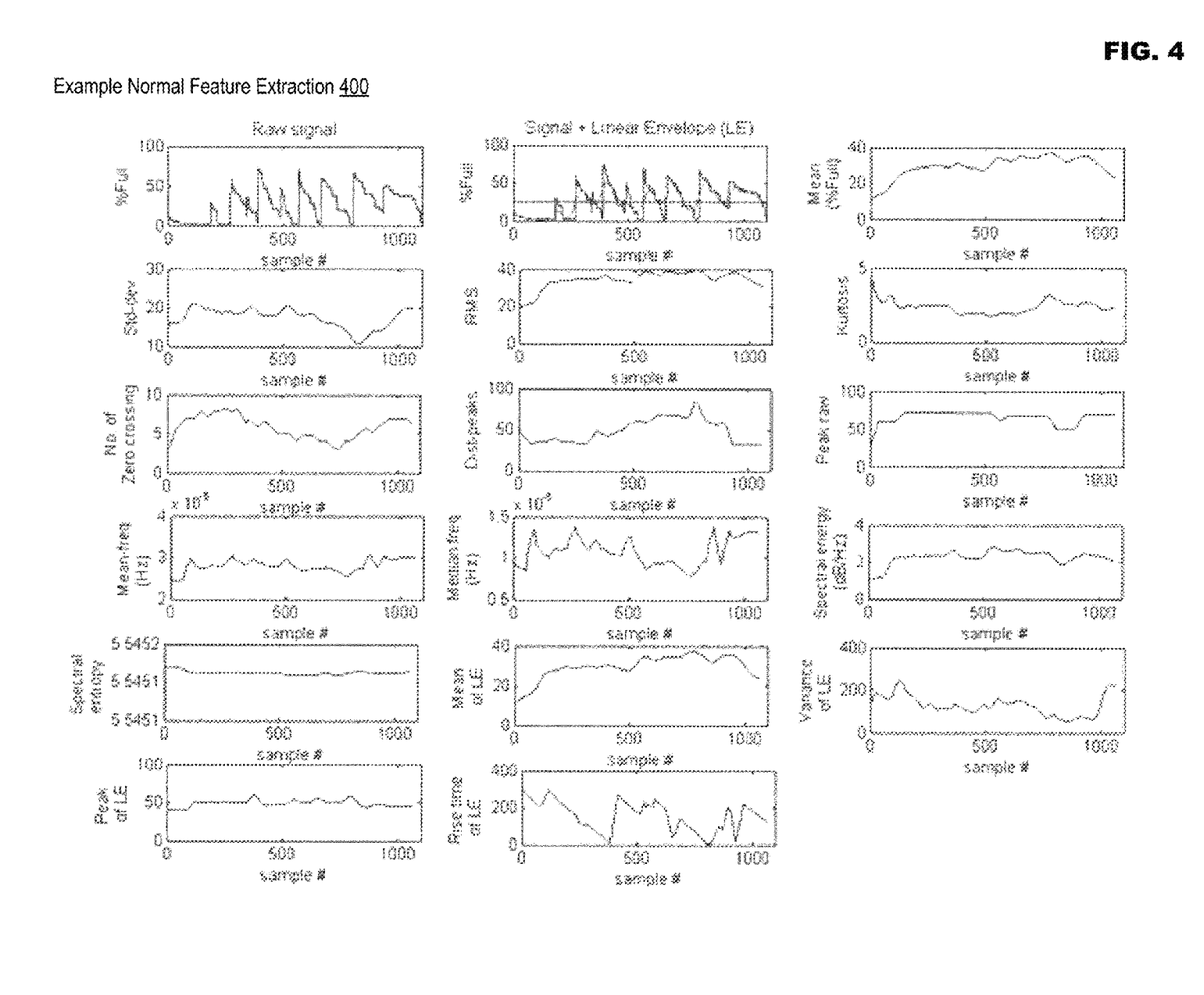
FIG. 4 illustrates example charts of extracted features consistent with a normal sensor condition in accordance with at least one embodiment of the present disclosure.
Figure 5:
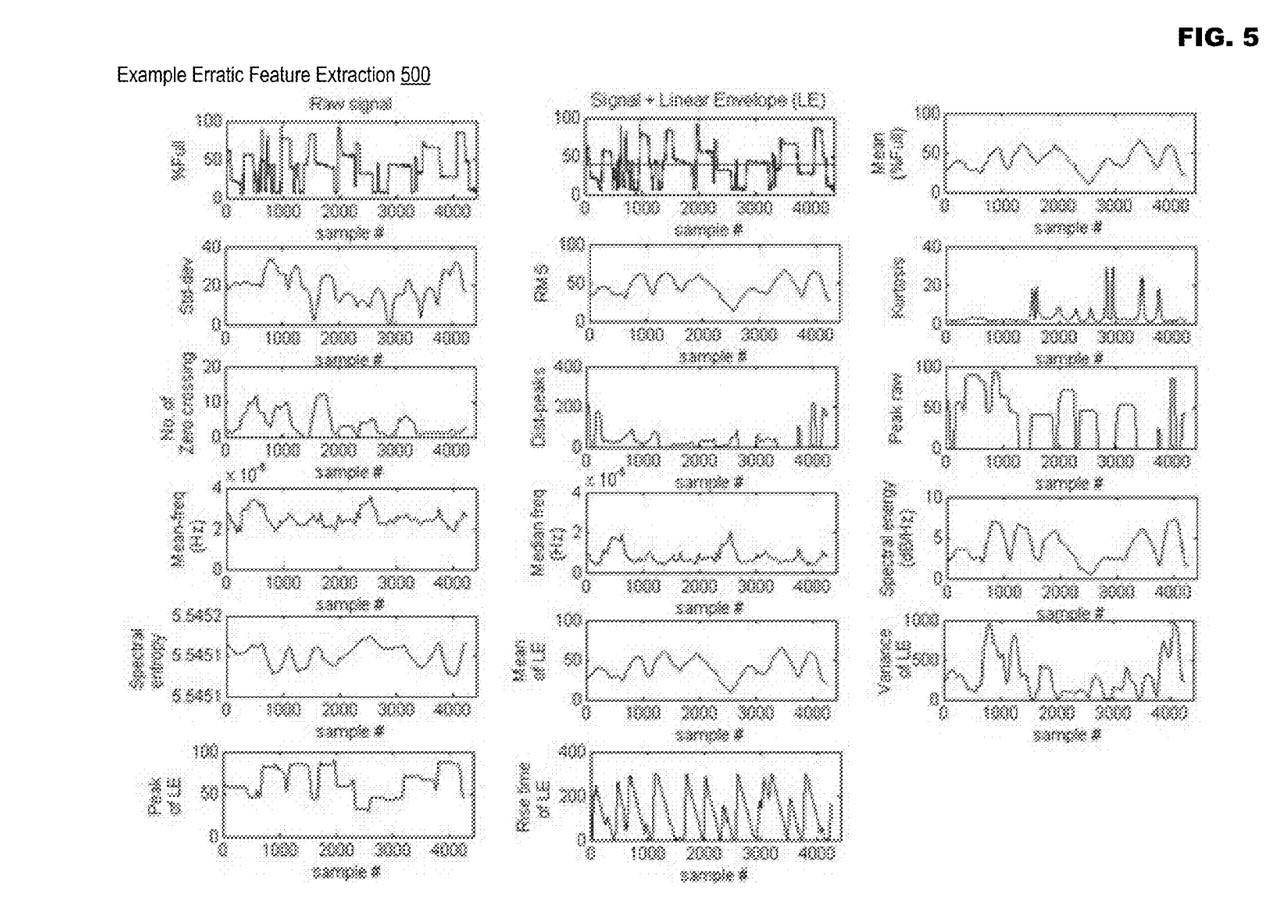
FIG. 5 illustrates example charts of extracted features consistent with an erratic sensor condition in accordance with at least one embodiment of the present disclosure.
Figure 6:
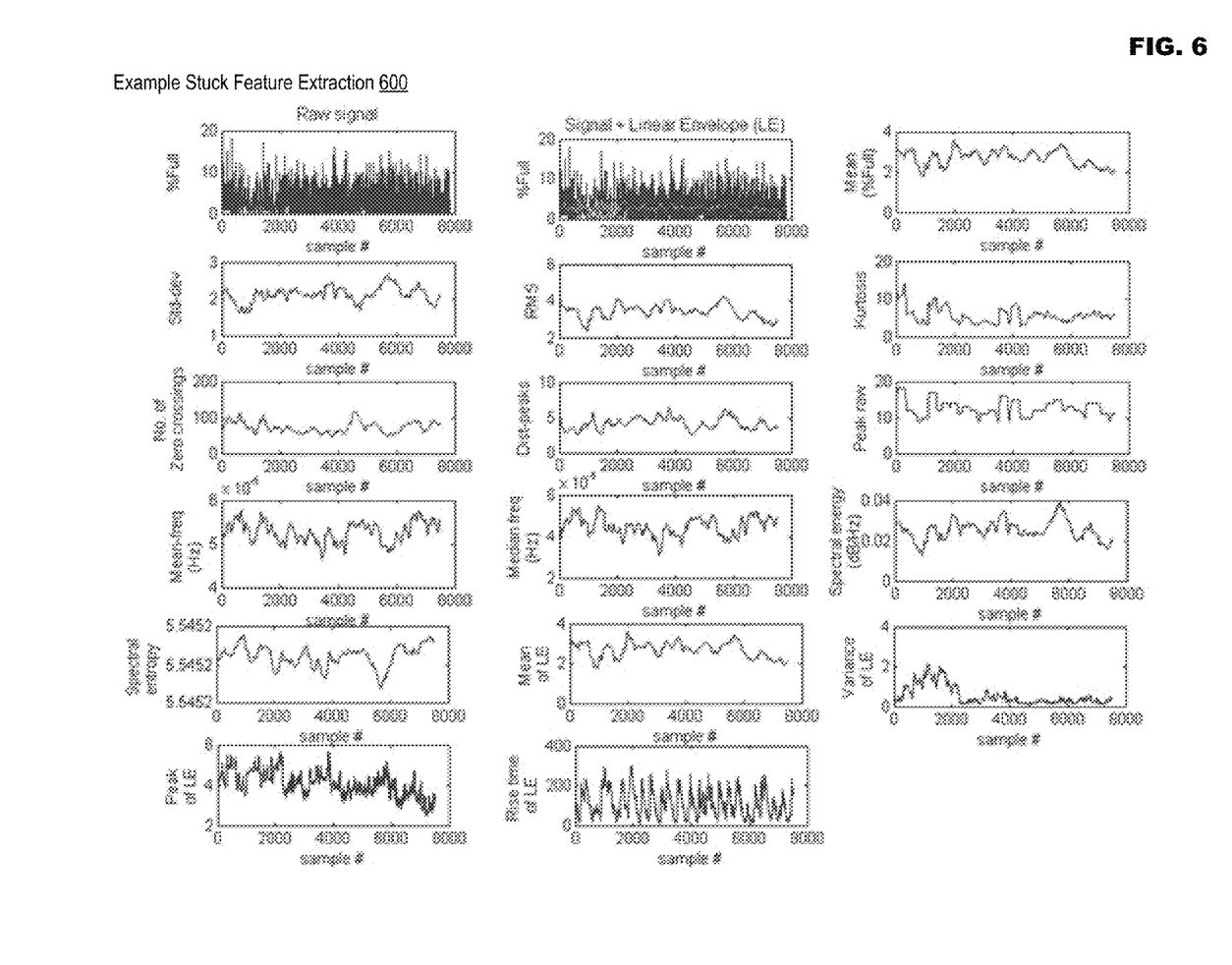
FIG. 6 illustrates example charts of extracted features consistent with a stuck sensor condition in accordance with at least one embodiment of the present disclosure.

FIG. 4 illustrates example charts of extracted features consistent with a normal sensor condition in accordance with at least one embodiment of the present disclosure. Example normal feature extraction 400 may be considered as criteria for determining when sensor signal 110 pertains to normal operation. On the contrary, example erratic feature extraction 500 in FIG. 5 discloses feature values exhibiting erratic behavior. In general, the features disclosed in FIG. 5 show more activity comprising more peaks with greater high/low peak differentiation, etc. Example stuck feature extraction in FIG. 6 discloses an example of features that exhibit a condition pertaining to when sensor 102 is stuck. Again, the differences between extraction 600 and extractions 400 and 500 are evident with the variation in high/low amplitude, waveform, etc.

Figure 7:
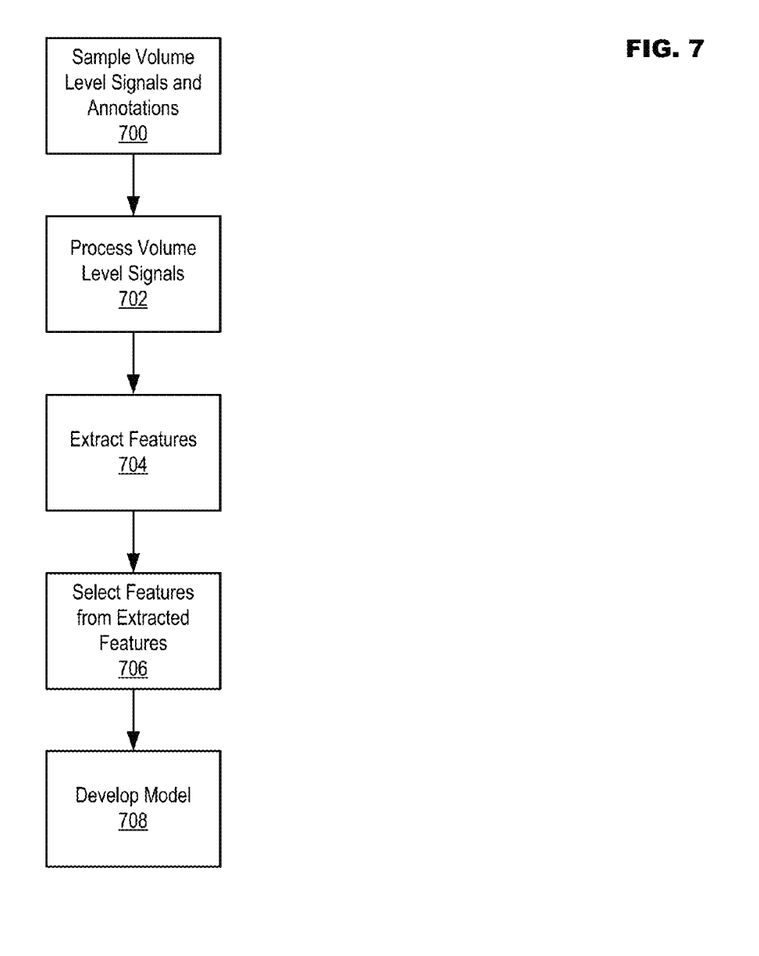
FIG. 7 illustrates example operations for teaching a model to determine sensor condition in accordance with at least one embodiment of the present disclosure.

FIG. 7 illustrates example operations for teaching a model to determine sensor condition in accordance with at least one embodiment of the present disclosure. Formulation of sensor condition model 302 may be initiated with feature selection, which may involve selecting a subset of relevant features from the entirety of available features for use in model construction. Following the generation of time domain and frequency domain features based on sensor signal 110, a selection method such as, for example, the RELIEF or RELIEFF feature selection algorithms may be used to select the most discriminative features (e.g., the features that have the greatest impact on yielding accurate condition determinations). The RELIEF algorithm may rank features based on similarities in values among samples belonging to the same category and dissimilarities in values among samples belonging to other categories. In at least one embodiment, time domain features 306 and frequency domain features 308 were selected as highly discriminative features.

SVMs may be supervised learning models with associated learning algorithms that may analyze data in order to generate patterns, used for classification and regression analysis. Given a set of training examples each marked as belonging to certain categories (e.g., conditions), an SVM training algorithm may build a model that is able to assign samples into the categories. FIG. 7 discloses example operations through which sensor condition model 302 may be trained. In operation 700 sensor signals 110 may be sampled along with corresponding annotations of observed sensor condition. For example, sensor 102 may be purposefully placed in an erratic or stuck condition so that sensor signal 110 may be sampled during the occurrence of each condition. Sensor signals 110 may then be processed in operation 702. Processing may comprise filtering sensor signals 110 to remove noise (e.g., by scanning the data for values that do not conform with immediately preceding and/or following values, removing values that are completely out of range, etc.), compensating for differences in sensor signals 110 that were received from different sensors 102 operating in different conditions, etc. In operation 704, features may be extracted from the sampled sensor signals 110. The features extracted in operation 704 may encompass the entirety of the features available from which the features that are most discriminative to sensor condition determination may be selected in operation 706. As discussed above, a feature selection algorithm may be used to select a subset of the extracted features in operation 706 (e.g., the extracted features leading to the best differentiation). Sensor condition model 302 may then be developed based on the extracted features selected in operation 708. For example, the selected features may be used to train sensor condition model 302 (e.g., to develop the feature space used in determining the sensor condition as normal, erratic or stuck).

The performance of a machine learning model may depend on the quality of data used to train the model. Factors such as mislabeling, noise in the data, changes in sample rate, etc. may cause degraded performance or erroneous predictions. It is important that annotation of sampled sensor signals 110 is highly accurate. Mislabeling of the samples would not only result in inappropriate feature selection, but may lead to inaccurate data boundaries adversely impacting the performance of sensor condition model 302. Operation of sensor condition model 302 may be based on pattern recognition. Hence its real-time performance depends heavily upon the data with which it has been trained. The samples used to train sensor condition model 302 should be selected to encompass all usage and fault patterns. Should the samples not be all-encompassing, the real-time performance of sensor condition model 302 may be degraded. Another source of error is noise in the sensor data. In electronics, noise is a random fluctuation in electrical signals, which is a characteristic of all electronic circuits. The noise seen in electronic devices may vary greatly, as it can be produced by several different effects. Thermal noise is unavoidable at non-zero temperature. For example, given the example of system 100' wherein volume sensor 102' is measuring the volume of liquid 108' (e.g., oil) in tanks 106', both sensors 102' and tanks 106' may be situated above ground and exposed to an outside environment in a tank yard. Extreme temperatures, especially severe hot weather, may affect electronics in sensors 102 adding random noise to sensor signal 110. Noise may be addressed during training through signal processing (e.g., de-noising sensor signal 110 using smoothing or filtering techniques). The variability of sampling rate could also be an issue. For example, in some scenarios the sampling rate of sensor signal 110 may be set by the customer. Changes in sampling rate would modify the pattern of sensor signals 110, and may affect how the classification space is developed in sensor condition model 302. Changes in sample rate may require signal calibration by deploying up-sampling or down-sampling methods prior to the data being fed to sensor condition model 302.

Figure 8:
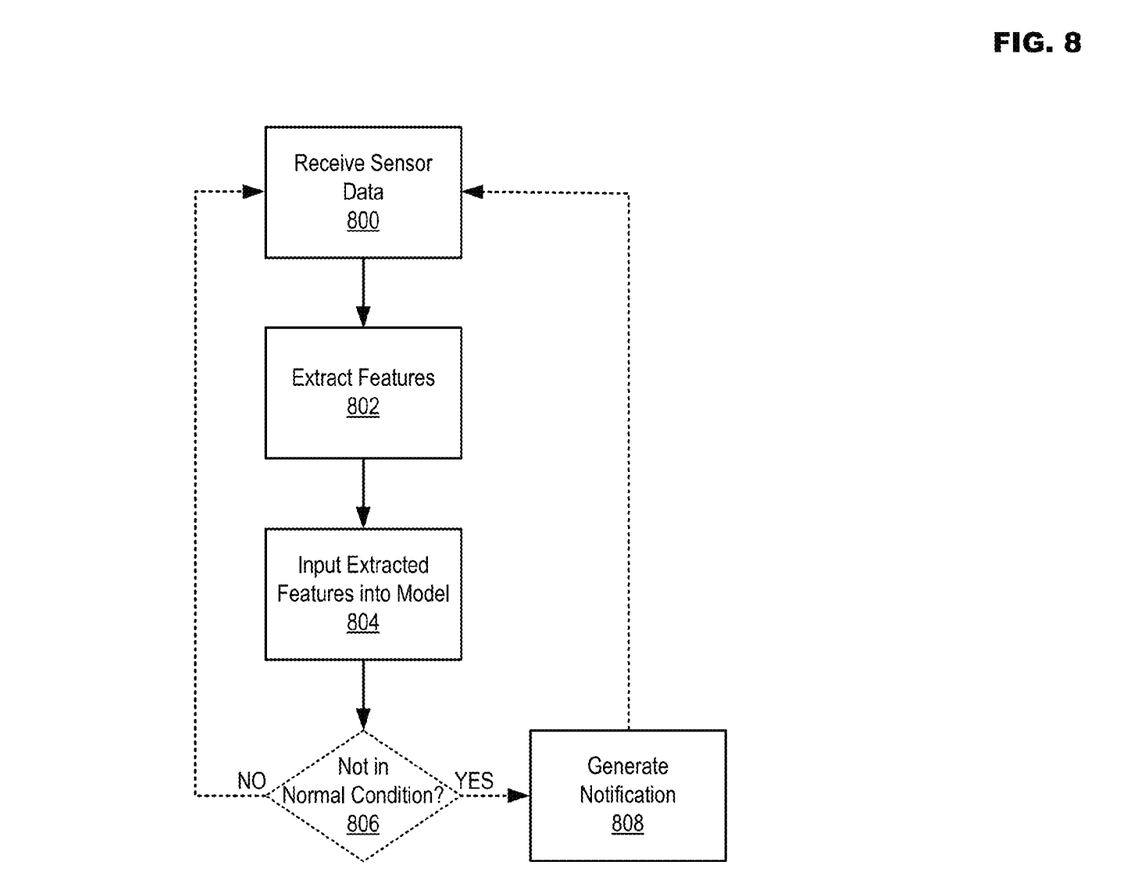
FIG. 8 illustrates example operations for determining sensor condition in accordance with at least one embodiment of the present disclosure.

FIG. 8 illustrates example operations for determining sensor condition in accordance with at least one embodiment of the present disclosure. In operation 800, sensor signal 110 may be received in MM 112 from sensor 102 via wired/wireless communication. In operation 802, various features may be extracted from sensor signal 110. The extracted features may include, for example, time domain features 306 and frequency domain features 308.

The extracted features may then be input into sensor condition model 302 in operation 804. Sensor condition model 302 may utilize the extracted features to determine a condition for sensor 102 as previously described herein. Operation 806 may be optional in that there is more than one manner in which a notification may be generated consistent with the present disclosure. For example, operation 806 may be included if notifications are only generated when sensor 102 is determined to require action (e.g., when in an erratic or stuck condition). A determination may be made in operation 806 as to whether the sensor is in an erratic or stuck condition based on the determination of sensor condition model 302. A determination in operation 806 that sensor 102 is not in an erratic or stuck condition may be followed by operation 800 wherein monitoring may continue. If in operation 806 it is determined that sensor 102 is in an erratic or stuck condition, then in operation 808 a notification may be generated indicating the condition of sensor 102 is in an erratic or stuck condition, that sensor 102 requires service, etc. In an alternative embodiment, notifications may be generated regularly in operation 808 as to the general health of sensor 102. For example, operation 808 may always occur after operation 804, operation 808 being followed by an optional return to operation 800 wherein the monitoring of sensor 102 may continue.

While FIGS. 7 and 8 illustrate operations according to different embodiments, it is to be understood that not all of the operations depicted in FIGS. 7 and 8 are necessary for other embodiments. Indeed, it is fully contemplated herein that in other embodiments of the present disclosure, the operations depicted in FIGS. 7 and 8, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

As used in any embodiment herein, the term "module" may refer to software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms part of a larger system, for example, an integrated circuit (IC), system on-chip (SoC), desktop computers, laptop computers, tablet computers, servers, smartphones, etc.

Any of the operations described herein may be implemented in a system that includes one or more storage mediums (e.g., non-transitory storage mediums) having stored thereon, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software modules executed by a programmable control device.

Thus, the present disclosure is directed to a system for determining sensor condition. A sensor signal generated by a sensor to communicate the current condition of an aspect being monitored by the sensor may also be employed to determine the condition of the sensor itself. For example, a device capable of determining if the sensor condition is normal or malfunctioning (e.g., erratic, stuck, etc.) may comprise a monitoring module (MM) to receive the sensor signal. The MM may comprise a sensor condition determination module (SCDM) to determine sensor condition. The SCDM may include a feature extraction engine to determine various characteristics of (e.g., to "extract features" from) the sensor signal and a model to determine sensor condition based on the extracted features. The model may include a support vector machine (SVM) taught to determine sensor condition utilizing sampled sensor signals correlated with annotations of sensor condition.

The following examples pertain to further embodiments. The following examples of the present disclosure may comprise subject material such as a device, a method, at least one machine-readable medium for storing instructions that when executed cause a machine to perform acts based on the method, means for performing acts based on the method and/or a system for determining sensor condition.

According to example 1 there is provided a device to determine sensor condition. The device may comprise a communication module to interact with at least a sensor and a monitoring module to receive a sensor signal from the sensor via the communication module, the monitoring module including a sensor condition determination module to determine a condition for the sensor based on the sensor signal.

Example 2 may include the elements of example 1, wherein the sensor is a volume sensor and the sensor signal is a volume level signal.

Example 3 may include the elements of example 2, wherein the sensor is a tank level sensor and the sensor signal is a tank level signal.

Example 4 may include the elements of any of examples 1 to 3, wherein the monitoring module is further to generate a sensor condition notification based on the condition.

Example 5 may include the elements of any of examples 1 to 4, wherein the sensor condition determination module is to determine that the sensor is in a normal condition, an erratic condition or a stuck condition based only on the sensor signal.

Example 6 may include the elements of any of examples 1 to 5, wherein the sensor condition determination module comprises at least a feature extraction engine to extract features from the sensor signal and a sensor condition model to determine the condition based at least on the extracted features.

Example 7 may include the elements of example 6, wherein the feature extraction engine is to extract at least time domain features and frequency domain features from the sensor signal.

Example 8 may include the elements of example 7, wherein the time domain features comprise at least mean, standard deviation, skewness, root mean square, number of zero crossings, maximum peaks raw and an average distance between peaks.

Example 9 may include the elements of any of examples 7 to 8, wherein the frequency domain features comprise at least median frequency, mean frequency, spectral energy, spectral entropy, mean of linear envelope, peak of linear envelope, variance of linear envelope and rise time of linear envelope.

Example 10 may include the elements of any of examples 6 to 9, wherein the sensor condition model comprises a support vector machine taught to determine the condition based on a sampling of sensor signals and corresponding annotations of sensor condition for each of the sampled sensor signals.

Example 11 may include the elements of any of examples 1 to 10, wherein the communication module interacts with the sensor via wireless communication.

Example 12 may include the elements of any of examples 1 to 11, wherein the communication module interacts with the sensor via a worksite accumulator configured to provide the sensor signal to the communication module.

Example 13 may include the elements of any of examples 1 to 12, wherein the sensor is located within the device.

Example 14 may include the elements of any of examples 1 to 13, wherein the device comprises at least one data server configured to operate in a cloud computing architecture.

According to example 15 there is provided a method for teaching a model to determine sensor condition. The method may comprise receiving at least one sensor signal from a sensor and a corresponding annotation of sensor condition including one of a normal condition, erratic condition or stuck condition, processing the at least one sensor signal, extracting features from the at least one sensor signal, selecting features from the extracted features and developing a model for determining sensor condition based at least on the selected features and the corresponding annotation.

Example 16 may include the elements of example 15, wherein the sensor is a volume sensor and the sensor signal is a volume level signal.

Example 17 may include the elements of any of examples 15 to 16, wherein the extracted features comprise time domain features and frequency domain features extracted from the sensor signal.

Example 18 may include the elements of example 17, wherein the time domain features comprise at least mean, standard deviation, skewness, root mean square, number of zero crossings, maximum peaks raw and an average distance between peaks.

Example 19 may include the elements of any of examples 17 to 18, wherein the frequency domain features comprise at least median frequency, mean frequency, spectral energy, spectral entropy, mean of linear envelope, peak of linear envelope, variance of linear envelope and rise time of linear envelope.

Example 20 may include the elements of any of examples 15 to 19, wherein developing the model comprises teaching a support vector machine in the model to determine sensor condition based on the selected features.

According to example 21 there is provided a method for determining sensor condition. The method may comprise receiving a sensor signal from a sensor, extracting features from the sensor signal, inputting the extracted features into a model for determining sensor condition and determining sensor condition based on the model.

Example 22 may include the elements of example 21, wherein the sensor is a volume sensor and the sensor signal is a volume level signal.

Example 23 may include the elements of any of examples 21 to 22, wherein determining the sensor condition comprises determining that the sensor is in a normal condition, an erratic condition or a stuck condition based only on the sensor signal.

Example 24 may include the elements of any of examples 21 to 23, wherein the extracted features comprise time domain features and frequency domain features extracted from the sensor signal.

Example 25 may include the elements of example 24, wherein the time domain features comprise at least mean, standard deviation, skewness, root mean square, number of zero crossings, maximum peaks raw and an average distance between peaks.

Example 26 may include the elements of any of examples 24 to 25, wherein the frequency domain features comprise at least median frequency, mean frequency, spectral energy, spectral entropy, mean of linear envelope, peak of linear envelope, variance of linear envelope and rise time of linear envelope.

Example 27 may include the elements of any of examples 21 to 26, and may further comprise generating a sensor condition notification based on the condition.

Example 28 may include the elements of any of examples 21 to 27, and may further comprise teaching a support vector machine in the model to determine the condition based on a sampling of sensor signals and corresponding annotations of sensor condition for each of the sampled sensor signals prior to receiving the sensor signal.

According to example 29 there is provided a system including at least a sensor and a device, the system being arranged to perform the method of any of the above examples 15 to 28.

According to example 30 there is provided a chipset arranged to perform the method of any of the above examples 15 to 28.

According to example 31 there is provided at least one machine readable medium comprising a plurality of instructions that, in response to be being executed on a computing device, cause the computing device to carry out the method according to any of the above examples 15 to 28.

According to example 32 there is provided a device configured for determining sensor condition, the device being arranged to perform the method of any of the above examples 15 to 28.

According to example 33 there is provided a system for teaching a model to determine sensor condition. The system may comprise means for receiving at least one sensor signal from a sensor and a corresponding annotation of sensor condition including one of a normal condition, erratic condition or stuck condition, means for processing the at least one sensor signal, means for extracting features from the at least one sensor signal, means for selecting features from the extracted features and means for developing a model for determining sensor condition based at least on the selected features and the corresponding annotation.

Example 34 may include the elements of example 33, wherein the sensor is a volume sensor and the sensor signal is a volume level signal.

Example 35 may include the elements of any of examples 33 to 34, wherein the extracted features comprise time domain features and frequency domain features extracted from the sensor signal.

Example 36 may include the elements of example 35, wherein the time domain features comprise at least mean, standard deviation, skewness, root mean square, number of zero crossings, maximum peaks raw and an average distance between peaks.

Example 37 may include the elements of any of examples 35 to 36, wherein the frequency domain features comprise at least median frequency, mean frequency, spectral energy, spectral entropy, mean of linear envelope, peak of linear envelope, variance of linear envelope and rise time of linear envelope.

Example 38 may include the elements of any of examples 33 to 37, wherein the means for developing the model comprise means for teaching a support vector machine in the model to determine sensor condition based on the selected features.

According to example 39 there is provided a system for determining sensor condition. The system may comprise means for receiving a sensor signal from a sensor, means for extracting features from the sensor signal, means for inputting the extracted features into a model for determining sensor condition and means for determining sensor condition based on the model.

Example 40 may include the elements of example 39, wherein the sensor is a volume sensor and the sensor signal is a volume level signal.

Example 41 may include the elements of any of examples 39 to 40, wherein the means for determining the sensor condition comprise means for determining that the sensor is in a normal condition, an erratic condition or a stuck condition based only on the sensor signal.

Example 42 may include the elements of any of examples 39 to 41, wherein the extracted features comprise time domain features and frequency domain features extracted from the sensor signal.

Example 43 may include the elements of example 42, wherein the time domain features comprise at least mean, standard deviation, skewness, root mean square, number of zero crossings, maximum peaks raw and an average distance between peaks.

Example 44 may include the elements of any of examples 42 to 43, wherein the frequency domain features comprise at least median frequency, mean frequency, spectral energy, spectral entropy, mean of linear envelope, peak of linear envelope, variance of linear envelope and rise time of linear envelope.

Example 45 may include the elements of any of examples 39 to 44, and may further comprise means for generating a sensor condition notification based on the condition.

Example 46 may include the elements of any of examples 39 to 45, and may further comprise means for teaching a support vector machine in the model to determine the condition based on a sampling of sensor signals and corresponding annotations of sensor condition for each of the sampled sensor signals prior to receiving the sensor signal.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed:

1. A device to determine sensor condition, comprising:
communication circuitry to interact with at least a sensor, the sensor to monitor an asset and generate a sensor signal; and
monitoring circuitry to receive the sensor signal from the sensor via the communication circuitry, the monitoring circuitry including sensor condition determination circuitry to extract at least time domain features and frequency domain features from the sensor signal and to determine if the sensor is in a normal condition, an erratic condition or a stuck condition based only on the time domain features and frequency domain features.

2. The device of claim 1, wherein the sensor is a volume sensor and the sensor signal is a volume level signal.

3. The device of claim 2, wherein the sensor is a tank level sensor and the sensor signal is a tank level signal.

4. The device of claim 1, wherein the monitoring circuitry is further to generate a sensor condition notification based on the condition.

5. The device of claim 1, wherein the sensor condition model comprises a support vector machine taught to determine the condition based at least in part on a sampling of sensor signals and corresponding annotations of sensor condition for each of the sampled sensor signals.

6. A method for teaching a model to determine sensor condition, comprising:
receiving, via communication circuitry, at least one sensor signal from a sensor and a corresponding annotation of sensor condition including one of a normal condition, erratic condition or stuck condition;
processing the at least one sensor signal;
extracting features from the at least one sensor signal with sensor condition determination (SCD) circuitry;
selecting, with the sensor condition determination (SCD) circuitry selected features from the extracted features, said selected features comprising at least time domain features and frequency domain features of said sensor signal; and
determining a model for determining sensor condition based at least on the selected features and the corresponding annotation, the model correlating the sensor condition to at least the time domain features and the frequency domain features.

7. The method of claim 6, wherein the sensor is a volume sensor and the sensor signal is a volume level signal.

8. The method of claim 6, wherein developing the model comprises teaching a support vector machine in the model to determine sensor condition based on the selected features.

9. A method for determining sensor condition, comprising:
receiving, via communication circuitry, a sensor signal from a sensor;
extracting features from the at least one sensor signal with sensor condition determination (SCD) circuitry the extracted features comprising at least time domain features and frequency domain features of said sensor signal;
inputting, with the SCD circuitry, the extracted features into a model for determining sensor condition; and
determining, with the SCD circuitry, if the sensor is in a normal condition, an erratic condition or a stuck condition based on the model.

10. The method of claim 9, wherein the sensor is a volume sensor and the sensor signal is a volume level signal.

11. The method of claim 9, further comprising:
generating a sensor condition notification based on the condition.

12. The method of claim 9, further comprising:
teaching a support vector machine in the model to determine the condition based on a sampling of sensor signals and corresponding annotations of sensor condition for each of the sampled sensor signals prior to receiving the sensor signal.

13. At least one non-transitory machine-readable storage medium having stored thereon, individually or in combination, instructions for determining sensor condition that, when executed by one or more processors, cause the one or more processors to:
receive, via communication circuitry, a sensor signal from a sensor;
extract, by the one or more processors, selected features from the sensor signal, the extracted features comprising at least time domain features and frequency domain features of said sensor signal;
input the extracted features into a model for determining sensor condition; and
determine if the sensor is in a normal condition, an erratic condition or a stuck condition based only on the model and the extracted features.

14. The non-transitory machine-readable storage medium of claim 13, wherein the sensor is a volume sensor and the sensor signal is a volume level signal.

15. The non-transitory machine-readable storage medium of claim 13, further comprising instructions that, when executed by one or more processors, cause the one or more processors to:
generate a sensor condition notification based on the determined condition of the sensor.

16. The non-transitory machine-readable storage medium of claim 13, further comprising instructions that, when executed by one or more processors, cause the one or more processors to:
teach a support vector machine in the model to determine the condition based on a sampling of sensor signals and corresponding annotations of sensor condition for each of the sampled sensor signals prior to receiving the sensor signal.

* * * * *